United States Patent [19]

Beckmann et al.

[11] Patent Number: 5,623,075
[45] Date of Patent: Apr. 22, 1997

[54] THIAZOLEMETHINE DYES

[75] Inventors: Stefan Beckmann, Bad Dürkheim; Karl-Heinz Etzbach, Frankenthal; Rüdiger Sens, Mannheim, all of Germany

[73] Assignee: BASF Aktiengesellschaft, Ludwigshafen, Germany

[21] Appl. No.: 496,203

[22] Filed: Jun. 28, 1995

[30] Foreign Application Priority Data

Jul. 5, 1994 [DE] Germany .......................... 44 23 485.6

[51] Int. Cl.$^6$ .......................... C07D 417/06; C09B 21/00
[52] U.S. Cl. .................... 546/269.7; 546/268.4; 544/111; 544/366
[58] Field of Search ...................... 548/146, 182, 548/184, 190; 546/280, 268.4, 269.7; 544/111, 360

[56] References Cited

U.S. PATENT DOCUMENTS

| | | | |
|---|---|---|---|
| 4,153,606 | 5/1979 | Scherberich | 260/306.7 |
| 4,804,668 | 2/1989 | Takase et al. | 514/314 |
| 4,906,750 | 3/1990 | Gunther et al. | 544/300 |
| 5,089,044 | 2/1992 | Harde et al. | 71/90 |
| 5,147,845 | 9/1992 | Sens et al. | 526/256 |
| 5,414,085 | 5/1995 | Buechler | 544/300 |
| 5,436,306 | 7/1995 | Etzbach et al. | 503/227 |

FOREIGN PATENT DOCUMENTS

| | | |
|---|---|---|
| 0416434 | 3/1991 | European Pat. Off. . |
| 0572898 | 12/1993 | European Pat. Off. . |
| 64-31868 | 2/1989 | Japan . |
| WO95/20181 | 7/1995 | WIPO . |

OTHER PUBLICATIONS

Zeitschrift Fuer Naturforschung, 1965, pp. 1441–1471, W. Liptay, "Die Loesungsmittelabhaengigkeit der Wellenzahl von Elektronenbanden und die Chemisch–Physikalischen Grundlagen".

The Journal of Organic Chemistry, vol. 54, No. 16, pp. 3774–3778, M. S. Paley, et al., "A Solvatochromic Method for Determining Second–Order Polarizabilities of Organic Molecules", 1989.

Chemistry & Industry, No. 19, pp. 600–608, Oct. 1, 1990, Carole Jones, "Polymers for Non–Linear Optical Devices".

*Primary Examiner*—Mukund J. Shah
*Assistant Examiner*—Pavanaram K. Sripada
*Attorney, Agent, or Firm*—Oblon, Spivak, McClelland, Maier & Neustadt, P.C.

[57] ABSTRACT

Thiazolemethine dyes of the formula

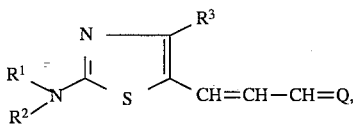

where $R^1$ and $R^2$ are each hydrogen, $C_1$-$C_8$-alkyl with or without substitution, $C_3$-$C_4$-alkenyl, $C_5$-$C_7$-cycloalkyl, phenyl or tolyl, or are together with the nitrogen atom joining them together a heterocyclic radical, $R^3$ is hydrogen, halogen, $C_1$-$C_8$-alkyl, substituted or unsubstituted phenyl, substituted or unsubstituted benzyl, cyclohexyl, thienyl, hydroxyl or $C_1$-$C_8$-monoalkylamino, and Q is the radical of an acidic-CH compound, are useful in nonlinear optics.

8 Claims, No Drawings

THIAZOLEMETHINE DYES

The present invention relates to novel thiazolemethine dyes of the formula I

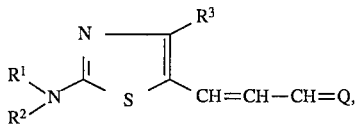

where
R$^1$ and R$^2$ are independently of each other hydrogen, C$_1$-C$_8$-alkyl with or without substitution and with or without interruption by one or two oxygen atoms in the ether function, C$_3$-C$_4$-alkenyl, C$_5$-C$_7$-cycloalkyl, phenyl or tolyl, or are together with the nitrogen atom joining them together a five- or six-membered saturated heterocyclic radical with or without further hetero atoms,
R$^3$ is hydrogen, halogen, C$_1$-C$_8$-alkyl, substituted or unsubstituted phenyl, substituted or unsubstituted benzyl, cyclohexyl, thienyl, hydroxyl or C$_1$-C$_8$-monoalkylamino, and
Q is the radical of an acidic-CH compound,
and to the use thereof in nonlinear optics.

It is an object of the present invention to provide novel thiazole-based methine dyes which shall be advantageous for use in polymeric nonlinear optical systems. More particularly, such dyes shall possess large hyperpolarizability values, good thermostability, good compatibility with the polymers used in nonlinear optical systems, and good film-forming properties with copolymers.

We have found that this object is achieved by the thiazolemethine dyes of the formula I defined at the beginning.

Q in the formula I, being the radical of an acidic-CH compound, can be derived for example from nitromethane, nitroethane or from compounds of the formulae IIa to IIh

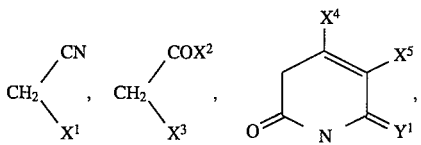
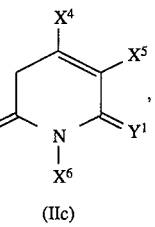
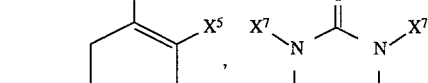
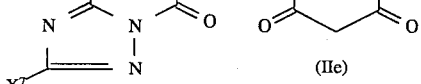
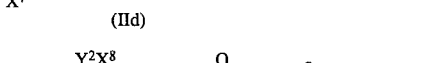
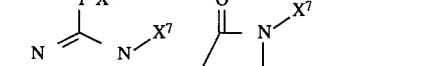

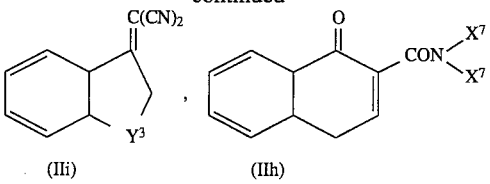

where
Y$^1$ is oxygen or a radical of the formula C(CN)$_2$,
Y$^2$ is oxygen or sulfur,
Y$^3$ is sulfonyl or a radical of the formula C(CN)$_2$,
X$^1$ is cyano, nitro, C$_1$-C$_4$-alkanoyl, substituted or unsubstituted benzoyl, C$_1$-C$_4$-alkylsulfonyl, substituted or unsubstituted phenylsulfonyl, carboxyl, C$_1$-C$_4$-alkoxycarbonyl, phenoxycarbonyl, carbamoyl, C$_1$-C$_4$-mono- or dialkylcarbamoyl, substituted or unsubstituted phenylcarbamoyl or substituted or unsubstituted phenyl,
X$^2$ is C$_1$-C$_6$-alkyl or C$_1$-C$_6$-alkoxy,
X$^3$ is C$_1$-C$_4$-alkoxycarbonyl or phenylcarbamoyl,
X$^4$ is hydrogen or C$_1$-C$_6$-alkyl,
X$^5$ is cyano, carbamoyl, C$_1$-C$_4$-alkoxycarbonyl or acetyl,
X$^6$ is hydrogen, C$_1$-C$_8$-alkyl, amino, C$_1$-C$_6$-mono- or dialkylamino, C$_1$-C$_4$-monoalkanoylamino, benzoylamino or N-(C$_1$-C$_4$-alkanoyl)-N-benzoylamino,
X$^7$ is hydrogen, C$_1$-C$_8$-alkyl, benzyl or phenyl, and
X$^8$ is C$_1$-C$_8$-alkyl.

Any alkyl appearing in the abovementioned formulae can be straight-chain or branched.

Any substituted alkyl appearing in the abovementioned formulae may have as substituents for example cyano, phenyl, tolyl, hydroxyl, C$_1$-C$_6$-alkanoyloxy, acryloyloxy, methacryloyloxy, C$_1$-C$_4$-alkoxycarbonyl or C$_1$-C$_4$-alkoxycarbonyloxy with or without substitution by phenyl or C$_1$-C$_4$-alkoxy in the alkoxy group. The number of substituents is generally from 1 to 3, preferably 1 or 2.

Any substituted phenyl appearing in the abovementioned formulae may have as substituents for example C$_1$-C$_4$-alkyl, C$_1$-C$_4$-alkoxy, amino, hydroxyl, halogen or nitro. The number of substituents is generally from 1 to 3, preferably 1 or 2.

R$^1$, R$^2$, R$^3$, X$^2$, X$^4$, X$^6$, X$^7$ and X$^8$ are each for example methyl, ethyl, propyl, isopropyl, butyl, isobutyl, sec-butyl, tert-butyl, pentyl, isopentyl, neopentyl, tert-pentyl, hexyl or 2-methyl-pentyl.

R$^1$, R$^2$, R$^3$, X$^6$, X$^7$ and X$^8$ may each also be for example heptyl, octyl, isooctyl or ethylhexyl.

R$^1$ and R$^2$ may each also be for example 2-methoxyethyl, 2- or 3-methoxypropyl, 2-ethoxyethyl, 2- or 3-ethoxypropyl, 2-propoxyethyl, 2- or 3-propoxypropyl, 2-butoxyethyl, 2- or 3-butoxypropyl, 3,6-dioxaheptyl, 3,6-dioxaoctyl, 2-hydroxyethyl, 2- or 3-hydroxypropyl, 2- or 4-hydroxybutyl, 5-hydroxypentyl, 6-hydroxyhexyl, 7-hydroxyheptyl, 8-hydroxyoctyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-acryloyloxyethyl, 2-methacryloyloxyethyl, 2- or 3-acryloyloxypropyl, 2- or 3-methacryloyloxypropyl, 2- or 4-acryloyloxybutyl, 2- or 4-methacryloyloxybutyl, 5-acryloyloxypentyl, 5-methacryloxypentyl, 6-acryloyloxyhexyl, 6-methacryloyloxyhexyl, 7-acryloyloxyheptyl, 7-methacryloyloxyheptyl, 8-acryloyloxyoctyl, 8-methacryloyloxyoctyl, 2-methoxycarbonylethyl, 2- or 3-methoxycarbonylpropyl, 2-ethoxycarbonylethyl, 2- or 3-ethoxycarbonylpropyl 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl, 2- or 3-(2-ethoxyethoxycarbonyloxy)propyl, benzyl, 2-methylbenzyl, 1- or 2-phenylethyl, cyclopentyl, cyclohexyl, cycloheptyl, 2-, 3- or 4-methylphenyl, allyl or methallyl.

$R^3$ may also be for example fluorine, chlorine, bromine, phenyl, 2-methylphenyl, 2,4-dimethylphenyl, 2-methoxyphenyl, 2,4-dimethoxyphenyl, benzyl, 2-methylbenzyl, 2,4-dimethylbenzyl, 2-methoxybenzyl, 2,4-dimethoxybenzyl, methylamino, ethylamino, propylamino, isopropylamino, butylamino, pentylamino, hexylamino, heptylamino, octylamino or 2-ethylhexylamino.

$R^1$ and $R^2$ combined with the nitrogen atom joining them together into a five- or six-membered saturated heterocyclic radical with or without further hetero atoms can be for example pyrrolidinyl, piperidinyl, morpholinyl, piperazinyl or N-($C_1$-$C_4$-alkyl)piperazinyl.

$X^1$, $X^3$ and $X^4$ are each for example methoxycarbonyl, ethoxycarbonyl, propoxycarbanyl, isopropoxycarbonyl or butoxycarbonyl.

$X^1$ may also be for example formyl, acetyl, propionyl, butyryl, isobutyryl, benzoyl, 2-, 3- or 4-methylbenzoyl, 2-, 3- or 4-methoxybenzoyl, methylsulfonyl, ethylsulfonyl, propylsulfonyl, isopropylsulfonyl, butylsulfonyl, phenylsulfonyl, 2-, 3- or 4-methylphenylsulfonyl, 2-, 3- or 4-methoxyphenylsulfonyl, 2-, 3- or 4-chlorophenylsulfonyl, mono-or dimethylcarbamoyl, mono- or diethylcarbamoyl, mono- or dipropylcarbamoyl, mono- or diisopropylcarbamoyl, mono- or dibutylcarbamoyl, N-methyl-N-ethylcarbamoyl, phenylcarbamoyl, 2-, 3- or 4-methylphenylcarbamoyl, 2-, 3- or 4-methoxyphenylcarbamoyl, phenyl, 2-, 3- or 4-methylphenyl, 2-, 3- or 4ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3- or 4-chlorophenyl, 2,4-dichlorophenyl, 2-, 3- or 4-nitrophenyl, 2-, 3- or 4-hydroxyphenyl or 2-, 3- or 4-aminophenyl.

$X^2$ may also be for example methoxy, ethoxy, propoxy, isopropoxy, butoxy, isobutoxy, sec-butoxy, tert-butoxy, pentyloxy, isopentyloxy, neopentyloxy, tert-pentyloxy or hexyloxy.

$X^6$ may also be for example mono- or diethylamino, mono- or diethylamino, mono- or dipropylamino, mono- or diisopropylamino, mono- or dibutylamino, mono- or dipentylamino, mono- or dihexylamino, N-methyl-N-ethylamino, formylamino, acetylamino, propionylamino, butyrylamino, isobutyrylamino or N-acetyl-N-benzoylamino.

Preference is given to thiazolemethine dyes of the formula I wherein $R^1$ and $R^2$ are independently of each other $C_1$-$C_6$-alkyl or hydroxyl-, acryloyloxy- or methacryloyloxy-substituted $C_2$-$C_6$-alkyl.

Preference is further given to thiazolemethine dyes of the formula I wherein $R^3$ is $C_1$-$C_6$-alkyl or substituted or unsubstituted phenyl, especially $C_1$-$C_6$-alkyl, phenyl, hydroxyphenyl or aminophenyl.

Particular preference is given to thiazolemethine dyes of the formula I where $R^3$ is $C_1$-$C_6$-alkyl or phenyl.

Particular preference is further given to thiazolemethine dyes of the formula I where Q is derived from a compound of the formula IIc, IIe or IIg.

Very particular preference is given to thiazolemethine dyes of the formula I where Q is derived from a compound of the formula IIc, IIe or IIg where $Y^1$ and $Y^2$ are each oxygen, $X^4$ is methyl, $X^5$ is cyano, $X^6$ is $C_1$-$C_6$-alkyl, acetylamino or N-acetyl-N-benzoylamino and $X^7$ is $C_1$-$C_6$-alkyl, benzyl or phenyl.

The thiazolemethine dyes of the formula I can be prepared in a conventional manner, for example by condensing an aldehyde of the formula III

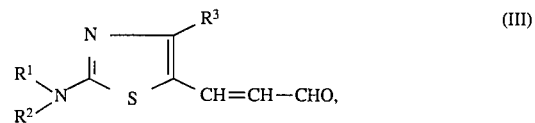

where $R^1$, $R^2$ and $R^3$ are each as defined above, with an acidic-CH compound of the formula IV

$$H_2Q \qquad (IV),$$

where Q is as defined above.

The preparation of the aldehydes of the formula III is described for example in German Patent Application P 44 01 912.2.

The thiazolemethine dyes of the formula I are advantageous for use in nonlinear optics.

The compounds of the present invention are thermally stable and have particularly large molecular hyperpolarizability values ($\beta_0$). The dyes also possess good compatibility with the polymers used in nonlinear optical systems and also good film-forming properties in copolymers.

The molecular hyperpolarizability can be determined for example by measuring the solvatochromism (see for example Z. Naturforschung 20a (1965), 1441–71, or J. Org. Chem. 54 (1989), 3775–78). This method of measurement involves determining the position of the absorption band of a compound in different solvents, for example in dioxane or dimethyl sulfoxide. The shift of the absorption band is then directly proportional to the $\beta_0$ value, i.e. compounds having a large solvatochromic shift have a large molecular hyperpolarizability and are therefore highly suitable for use in nonlinear optical systems (see for example Chemistry and Industry 1990, 600–608).

Attention may be drawn in particular to the suitability of the novel substances for use in communications technology, electro-optical modulators (e.g. Mach-Zehnder interferometers), optical switches, frequency mixing or waveguides.

The novel thiazolemethine dyes of the formula I are also advantageously suitable for example for dyeing or printing textile materials. These are for example fibers or fabrics, especially of polyesters, but also of cellulose esters or polyamides, or blend fabrics of polyesters and cellulose fibers or wool.

The novel thiazolemethine dyes of the formula I are further advantageously suitable for mass coloring polymers, for use in electrophotography as dyes for electrostatic toners or as thermal transfer dyes.

The Examples which follow illustrate the invention.

EXAMPLE 1

1.16 g (0.01 mol) of the compound of the formula

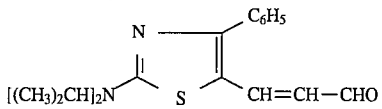

and 2.32 g (0.01 mol) of N,N'-diphenylbarbituric acid were heated together with 0.35 g of sodium acetate and 20 ml of acetic anhydride at 80° C. for 2 h. The batch was then cooled down to 20° C. and filtered with suction, and the precipitate was washed with a little methanol and dried at 50° C. under reduced pressure to leave 1.68 g of the compound of the formula

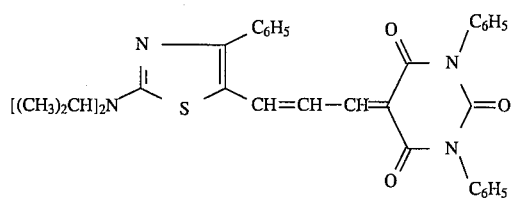

mp.: 235° C.

EXAMPLE 2

3.9 g (0.01 mol) of the compound of the formula

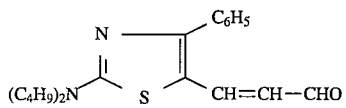

and 1.64 g (0.01 mol) of the compound of the formula

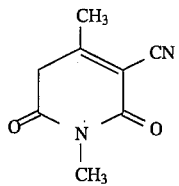

were heated together with 0.35 g of sodium acetate and 18 mol of acetic anhydride at 80° C. for 2 h. The precipitate formed on cooling down to 20° C. was filtered off with suction, washed with a little methanol and dried at 50° C. under reduced pressure to leave 1.65 g of the compound of the formula

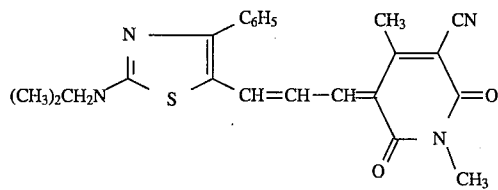

mp.: 220° C. Calculated: C 71.43 H 6.82 N 8.62 Found: C 70.98 H 6.78 N 8.44

EXAMPLE 3

3.9 g (0.01 mol) of the compound of the formula

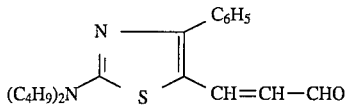

and 2.40 g (0.01 mol) of the compound of the formula

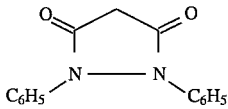

(V)

were heated at 80° C. in 20 ml of acetic anhydride for 2 h. After cooling down, the resulting precipitate was filtered off with suction, washed with methanol and dried at 50° C. under reduced pressure to leave 2.35 g of the compound of the formula

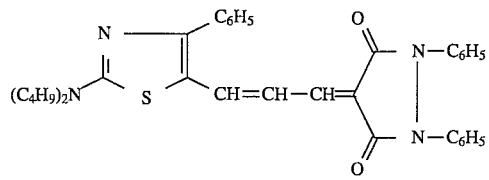

mp.: 220° C.

EXAMPLE 4

Example 1 was repeated with the N,N'-diphenylbarbituric acid replaced by the corresponding amount of N,N'-dibenzylbarbituric acid, affording 0.7 g of the compound of the formula

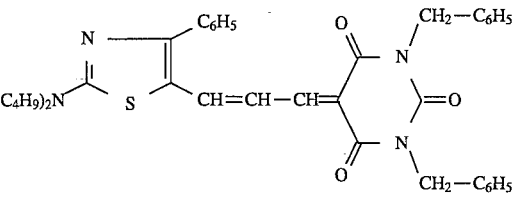

mp.: 203° C.

EXAMPLE 5

Example 2 was repeated with the N-methylpyridone replaced by the corresponding amount of N-hexylpyridone, affording 3.16 g of the compound of the formula

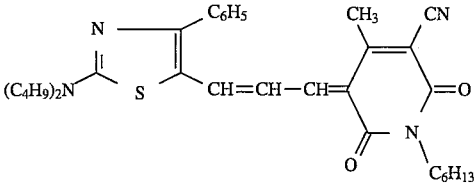

Calculated: C 70.93 H 7.58 N 10.03 Found: C 70.60 H 7.50 N 10.10

The same method gives the compounds listed below in Table 1.

TABLE 1

| Ex. No. | Formula |
|---|---|
| 6 | (structure: 2-(dibutylamino)-4-phenyl-thiazole linked via CH=CH−CH= to a pyridinedione bearing CH$_3$, CN, and N−C$_4$H$_9$) |
| 7 | (structure: 2-(dibutylamino)-4-phenyl-thiazole linked via CH=CH−CH= to a 1,3-diethyl-2-thiobarbiturate) |
| 8 | (structure: 2-(dibutylamino)-4-phenyl-thiazole linked via CH=CH−CH= to a 1,3-dimethylbarbiturate) |
| 9 | (structure: 2-(dibutylamino)-4-phenyl-thiazole linked via CH=CH−CH= to pyridinedione with CH$_3$, CN, and N−N(COCH$_3$)(COC$_6$H$_5$)) |
| 10 | (structure: 2-(dibutylamino)-4-phenyl-thiazole linked via CH=CH−CH= to pyridinone with CH$_3$, CN, =C(CN)$_2$, N−CH$_3$) |
| 11 | (structure: 2-[N-(2-hydroxyethyl)-N-ethylamino]-4-phenyl-thiazole linked via CH=CH−CH= to 1,3-dimethylbarbiturate) |
| 12 | (structure: 2-(dibutylamino)-4-(4-hydroxyphenyl)-thiazole linked via CH=CH−CH= to 1,3-dimethylbarbiturate) |

TABLE 1-continued

| Ex. No. | Formula |
|---|---|
| 13 | 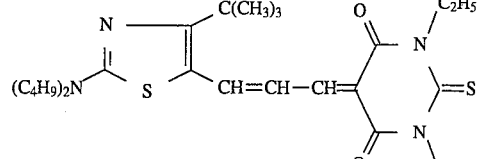 |
| 14 | 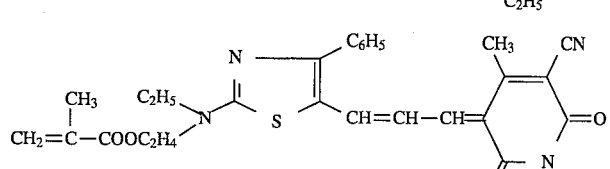 |
| 15 | 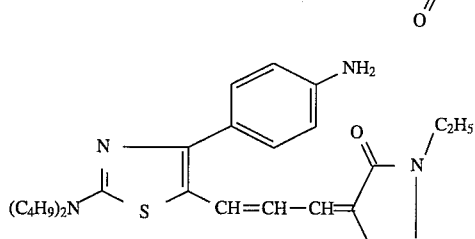 |

The method described in Z. Naturforschung 20a (1965), 1441–71, was employed to measure the absorption maximum of the individual dyes in both dioxane and dimethyl sulfoxide (DMSO), from which the solvatochromic shift $\Delta_{\nu}^{18}$ [cm$^{-1}$] was determined.

The respective results are listed below in Table 2.

TABLE 2

| Ex. No. | $\lambda_{max}$ (dioxane) [nm] | $\lambda_{max}$ (DMSO) [nm] | $\Delta\bar{\nu}$ [cm$^{-1}$] |
|---|---|---|---|
| 1 | 557 | 571 | 440 |
| 2 | 576 | 633 | 1563 |
| 3 | 544 | 572 | 900 |
| 4 | 544 | 570 | 838 |
| 5 | 573 | 634 | 1679 |
| 6 | 573 | 634 | 1679 |
| 7 | 578 | 600 | 634 |
| 8 | 537 | 560 | 765 |
| 9 | 536 | 541 | 172 |

We claim:

1. A thiazolemethine dye of the formula (I):

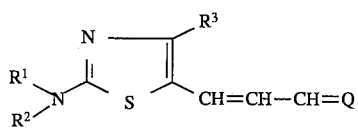

wherein:

$R^1$ and $R^2$ are independently of each other hydrogen, unsubstituted $C_1$-$C_8$-alkyl, with or without interruption by 1 or 2 oxygen atoms in ether function, $C_1$-$C_8$-alkyl, with or without interruption by 1 or 2 oxygen atoms in ether function, and which is substituted with cyano, phenyl, tolyl, hydroxyl, $C_1$-$C_6$ alkanoyloxy, acryloyloxy, methacryloyloxy, $C_1$-$C_4$-alkoxycarbonyl or $C_1$-$C_4$-alkoxycarbonyloxy with or without substitution by phenyl or $C_1$-$C_4$-alkoxy in the alkoxy group;

$C_3$-$C_4$-alkenyl, $C_3$-$C_7$-cycloalkyl, phenyl or tolyl;

or are together with a nitrogen atom joining them a 5- or 6-membered saturated heterocyclic radical selected from the group consisting of pyrrolidinyl, piperidinyl, morpholinyl, piperazinyl and N-($C_1$-$C_4$-alkyl) piperazinyl;

$R^3$ is hydrogen, halogen, $C_1$-$C_8$-alkyl, phenyl, phenyl substituted by $C_1$-$C_4$-alkyl, $C_1$-$C_4$-alkoxy, amino, hydroxyl, halogen or nitro;

benzyl; benzyl which phenyl ring thereof is substituted by $C_1$-$C_4$-alkyl, $C_1$-$C_4$-alkoxy, amino, hydroxyl, halogen or nitro; cyclohexyl, thienyl, hydroxyl or $C_1$-$C_8$-monoalkylamino; and Q is a radical of an acidic —CH compound, wherein Q is derived from nitromethane, nitroethane or from compounds of the formulae IIc, IIe or IIf:

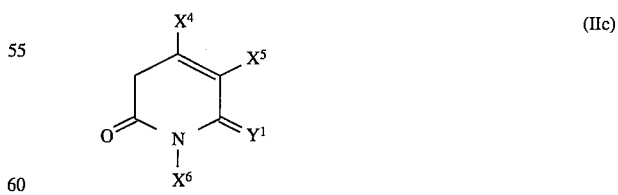

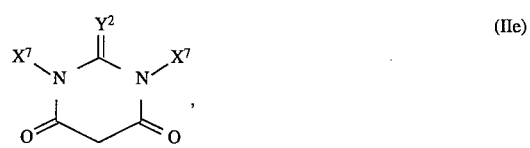

-continued

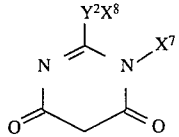
(IIf)

wherein:

$Y^1$ is oxygen or a radical of the formula —$C(CN)_2$;

$Y^2$ is oxygen or sulfur;

$X^4$ is hydrogen or $C_1$-$C_6$-alkyl;

$X^5$ is cyano, carbamoyl, $C_1$-$C_4$-alkoxycarbonyl or acetyl;

$X^6$ is hydrogen, $C_1$-$C_6$-alkyl, amino, $C_1$-$C_6$-mono- or dialkylamino, $C_1$-$C_4$-monoalkanoylamino, benzoylamino or N-($C_1$-$C_4$-alkanoyl) -N-benzoylamino;

$X^7$ is hydrogen, $C_1$-$C_6$-alkyl, benzyl or phenyl; and $X^8$ is $C_1$-$C_8$ alkyl.

2. The thiazolemethine dye of claim 1, wherein $R^1$ and $R^2$ are independently of each other $C_1$-$C_6$-alkyl or hydroxyl-, acryloyloxy- or methacryloyloxy-substituted $C_2$-$C_6$-alkyl.

3. The thiazolemethine dye of claim 1 wherein $R^3$ is $C_1$-$C_6$-alkyl phenyl or phenyl substituted with $C_1$-$C_4$-alkyl, $C_1$-$C_4$alkoxy, amino, hydroxyl, halogen or nitro.

4. The thiazolemethine dye of claim 1, wherein $R^3$ is $C_1$-$C_6$-alkyl, phenyl, hydroxyphenyl or aminophenyl.

5. The thiazolemethine dye of claim 1, wherein Q is radical IIc.

6. The thiazolemethine dye of claim 1, wherein Q is radical IIe.

7. The thiazolemethine dye of claim 1, wherein Q is radical IIf.

8. The thiazolemethine dye of claim 1, wherein Q is radical IIc or IIe; $Y^1$ and $Y^2$ are each oxygen; $X^4$ is methyl; $X^5$ is cyano; $X^6$ is $C_1$-$C_6$-alkyl, acetylamino or N-acetyl-N-benzoylamino; and $X^7$ is $C_1$-$C_6$-alkyl, benzyl or phenyl.

* * * * *